April 21, 1970   E. W. MOLL ETAL   3,508,079
LOGIC SENSING CIRCUIT WITH SINGLE PUSHBUTTON OPERATION
Filed April 24, 1967   3 Sheets-Sheet 1

INVENTORS.
EDWARD W. MOLL
STANLEY C. FENSTER
BY
Edward J. Feeney Jr.
ATTORNEY

United States Patent Office 3,508,079
Patented Apr. 21, 1970

3,508,079
LOGIC SENSING CIRCUIT WITH SINGLE PUSHBUTTON OPERATION
Edward W. Moll, King of Prussia, Pa., and Stanley C. Fenster, Parsippany, N.J., assignors to Burroughs Corporation, Detroit, Mich., a corporation of Michigan
Filed Apr. 24, 1967, Ser. No. 633,222
Int. Cl. H03k 17/00
U.S. Cl. 307—247
9 Claims

ABSTRACT OF THE DISCLOSURE

The present application discloses a switch logic sensing circuit which may be used in a data processing system. It utilizes a pushbutton switch in conjunction with a plurality of gates to provide a structure capable of sensing by logic means only, a pushbutton closure of undetermined time duration without sensing the same closure more than once until the pushbutton is released for reset. In addition, the disclosed apparatus provides a system for accomplishing this sensing which is inherently immune to switch contact bounce. Thus, it provides in one unit, a device which combines the features of antibounce and single sensing.

CROSS REFERENCE TO RELATED APPLICATION

The present application relates to another earlier filed application upon a somewhat similar device. The earlier application is entitled "A Single Pulse Switch Logic Circuit." Its inventors are Bruce W. Nutting and Milton Bozarth and its Ser. No. is 616,304. It is also assigned to the present assignee. Although the devices are similar it will be readily apparent to those skilled in the art that the present invention includes a novel means of sampling and clearing the circuit which was not disclosed nor claimed in the copending application.

BACKGROUND OF THE INVENTION

Field of the invention

Single pulses of one clock-time duration are often required to synchronize external input signals to digital computer systems. Such pulses are usually generated by the use of several circuits in combination, commonly known in the electronic digital computer art as NOR gates, NAND gates, flip-flops or single shots. It is therefore an object of the present invention to provide a novel combination of such circuits which possess a number of unique operational features.

Description of the prior art

In the prior art, there existed circuits capable of producing single output pulses having one clock pulse duration. Such circuits often included a plurality of flip-flops in conjunction with one or more single shots. Usually, however, prior art circuits either operated erratically due to switch contact bounce or conversely included sophisticated schemes to offset the bounce. Some circuits attacked the bounce problem by including filters in the switching lines to offset its effect. An example of this art is disclosed in the U.S. Patent No. 3,193,697 issued to G. R. Cogar et al. and entitled "Synchronized Single Pulser." That particular circuit however generated a gated pulse rather than a one clock time signal.

BRIEF SUMMARY OF THE INVENTION

The present invention is a device capable of producing a single pulse of varying duration which can be as short as one clock time duration. The embodiment set forth herein includes a dual input holding flipflop, inputs for which are derived from a clock generator and a dual input NOR gate. The NOR gate is driven by two dual input NAND gates. One of the NAND gates receives its inputs from the normally high output side of the previously mentioned flipflop and from a computer generated cycle reset line.

The second NAND gate receives one of its inputs from a positive D.C. voltage source and the other from a latching feedback flipflop. This latching flipflop is, in turn, activated by a signal from the normally low output side of the aforementioned holding flipflop.

A single pole double throw switch alterably connected one or the other of the inputs to the second NAND gate to ground. Normally it is positioned such that the input from the latching feedback flipflop is grounded. Upon depression of the switch, the second input is correspondingly grounded to activate the second NAND gate. This sets the holding flipflop. The modified input configuration to the second NAND gate prevents any further change of state of the holding flipflop until a cycle reset pulse is received by the first NAND gate. When the reset pulse does arrive the state of the holding flipflop is changed. This prepares the circuit for another cycle of operation.

BRIEF DESCRIPTION OF THE DRAWINGS

The various features of the present invention may be best understood when considered together with the accompanying drawings in which.

DETAILED DESCRIPTION

Figure 1:
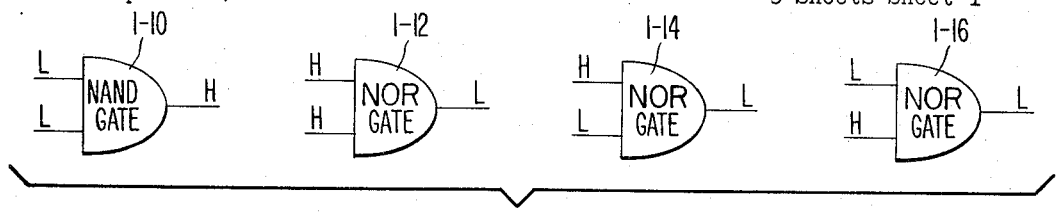
FIGURE 1 illustrates the logical rules of the NAND and NOR gates used by the circuit.

Referring, in particular, to FIGURE 1 there is illustrated a plurality of NAND gates showing various input signal combinations to the gates. In the gate 1-10 a first and a second input signal are denoted as low (L) signals. This, as the figure shows, provides a high (H) output signal. The high (H) and the low (L) signal connotations are well known as binary signal levels and hence such a specification is wide spread in the digital data processing art.

The simultaneous application of a pair of low signals to the NAND gate is the only combination of input signals that will enable the gate to provide a high (H) output signal. Thus, in all other input signal combinations the gate acts as an NOR gate, and as illustrated in gates 1–12, 1–14 and 1–16, the output signal is low (L).

Figure 3:
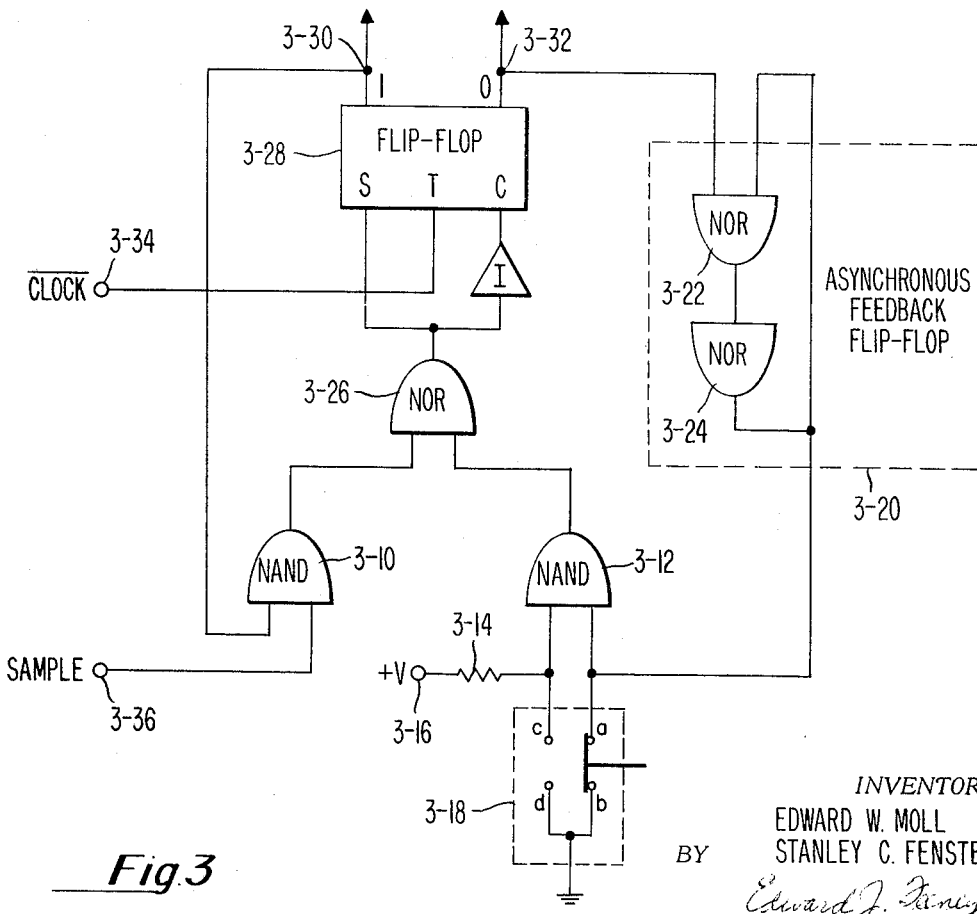
FIGURE 3 is a logical block diagram of the present invention showing the various interconnections of the logical circuits.

These rules will be used in the discussion of the entire logical circuit as illustrated in FIGURE 3.

Figure 2:
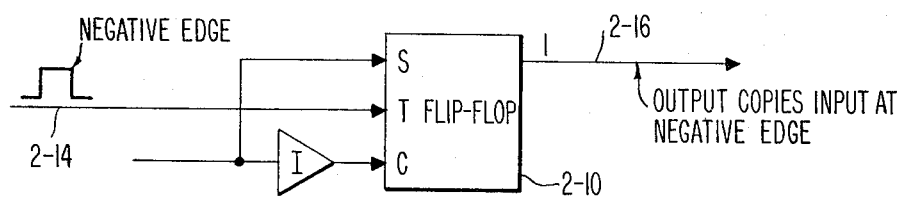
FIGURE 2 also illustrates the logical rules, but of the flipflop used in the configuration.

In FIGURE 2, a flipflop 2–10 is illustrated having three input terminals. They are denoted as the set (S) terminal, the timing or clock terminal (T) and the clear terminal (C).

The rule that is to be remembered for this figure is that the output signal on line 2–16 copies the input signal applied on line 2–14 at the negative going edge of the clock or timing pulse.

Referring next to FIGURE 3, there is shown a preferred embodiment of the present invention.

A holding flipflop 3–28 is normally positioned in the condition illustrated. Thus, a positive high output (1) is present at the output terminal 3-30, while a negative low output (0) exists at the output terminal 3-32.

This negative output at terminal 3-32 is applied to the NOR gate 3-22 of the latching flipflop 3-20. The inverting action of this NOR gate applies a positive level to next NOR gate 3-24. The signal is again inverted by this latter NOR gate and the negative output of the latching flipflop is applied to the NAND gate 3-12. This output signal is also returned to the second input terminal of the NOR gate 3-22 to provide the latching provision of the flipflop 3-20.

When the pushbutton of the switch 3-18 is depressed, the plunger contact leaves switch terminals a and b to break the connection of terminal a from ground. However, the action of the latching flipflop 3-20 previously described maintains the grounded (negative) connection of the terminal (a) of the switch 3-18.

Upon full depression of the switch arm, the grounded terminal d is connected to the second input terminal c. This enables NAND gate 3-12 to provide a signal to NOR gate 3-26. An output signal from NOR gate 3-26, in turn, activates flipflop 3-28 at clock time and the signals at terminals 3-30 and 3-32 are reversed.

Figure 4:
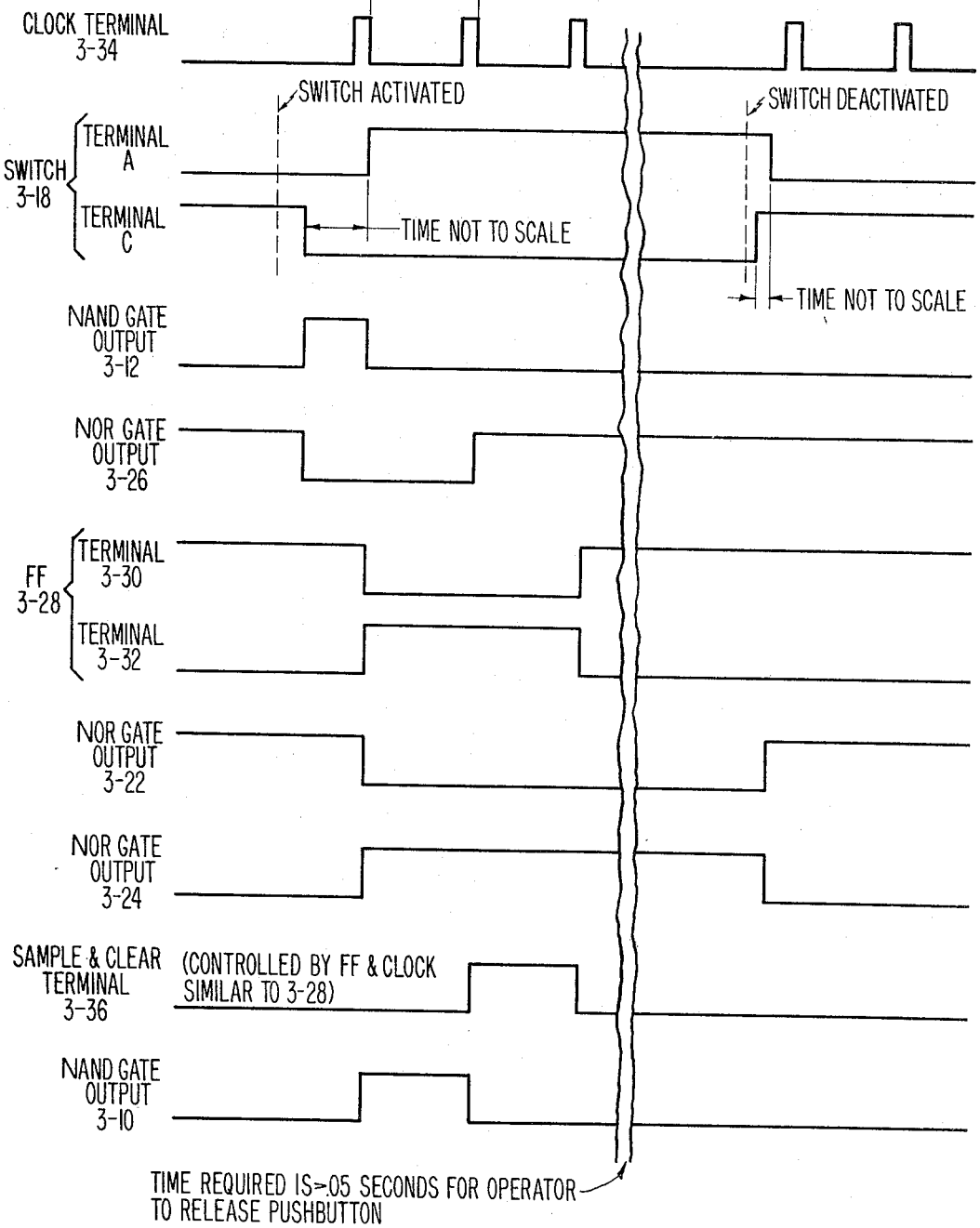
FIGURE 4 is a timing diagram illustrating the conditions of the waveforms at various points in the diagram shown in FIGURE 1, when the sample and clear signal arrives before the release of the pushbutton.

The negative signal terminal 3-30 of the flipflop 3-28 is applied to one of the input leads of the NAND gate 3-10. In addition a sample and clear signal is applied to terminal 3-36. It will be seen upon consideration of the timing diagrams illustrated in FIGURES 4 and 5 that the application of the sampling and clear signal will automatically reset the circuit of FIGURE 3 after the pushbutton 3-18 has been depressed. There are two types of operation of the FIGURE 3 circuit which must be considered. One is the situation where the pushbutton 3-18 is depressed, the button then released and a sample and clear signal received after such release. The second is where the pushbutton 3-18 is depressed, a sample and clear signal received at terminal 3-36 and the switch 3-18 subsequently released. The first situation is diagrammatically illustrated in the timing diagram of FIGURE 5 whereas the second situation is illustrated in FIGURE 4.

Consider first the operation of the circuit illustrated in FIGURE 3 with regard to the situation wherein the sample and clear signal is received between the depression and release of the pushbutton. Referring to FIGURE 4 a series of one megacycle clock signals are shown across the top of the drawing. As illustrated, there is a one microsecond time period between corresponding pulse edges. Immediately below the clock signal representation is the signal present at the terminal a of the pushbutton switch 3-18. It is seen that some time after the activation of the switch 3-18 the signal at terminal a of the switch rises to its high (H) level. This occurs at the trailing edge of the next successive clock pulse. Prior to this elevation of the signal level at terminal a, however, the signal level at terminal c is grounded by the action of the depressed plunger. This is seen in the next lower waveform indicated as terminal c. At the same time that terminal c goes low the input signal to NAND gate 3-12 goes high. Similarly, the input signal to NOR gate 3-26 goes low. The circuit remains in this condition until the receipt of the trailing edge of the next successive clock pulse, previously mentioned. At this time the flipflop 3-28 has a pair of output signals which are reversed from their previous condition. Thus the output signal at terminal 3-30 which was previously high goes low whereas the output signal at terminal 3-32 which was low goes high. Additionally, the output signal of NOR gate 3-22 and 3-24 similarly change at the arrival of the clock pulse trailing edge. The output signal of NOR gate 3-22 which was previously high goes low whereas the output signal of NOR gate 3-24 which was previously low goes high. Finally, the arrival of the trailing edge of the clock pulse by switching the flipflop 3-28 causes the asynchronous flipflop to change its state and the NAND gate 3-10 to shift from its low level to its high level. In the illustration assumed in FIGURE 4, the circuit remains in this condition until the arrival of the sample and clear signal to the terminal 3-36 shown in FIGURE 3. This sample and clear signal is controlled by a flipflop circuit and a clock signal source similar to that shown in FIGURE 3 as 3-28. The arrival of the signal to the terminal 3-36 is shown in FIGURE 4. It is the waveform immediately preceding the lowest waveform on the drawing. Thus the signal level at the terminal 3-36 changes from its low level to its high level. This situation reverses itself at the trailing edge of the next succeeding clock pulse. This latter shift by the sample and clear signal occurs simultaneously with the output signals of the flipflop 3-28 which return to their original state where they await the next cycle. The disjunctive line shown passing through the right-hand edge of FIGURE 4 is shown to illustrate a break or discontinuity in the passage of time between the signals to the left of the break and those to the right. Following this breaking time the switch is deactivated. This is illustrated by the second waveform of the figure. This deactivation causes the terminal a to return to its ground level. This, in turn, causes the NOR gate 3-22 and the NOR gate 3-24 to reverse their positions. This reversal applies a low signal to the input of NAND gate 3-12 and the entire circuit is now set for its next recycling. It should be noted here that the time required between the release of the pushbutton switch and its actual contact with terminal a will probably be greater than .05 second. This of course is a time period which is greatly in excess of those time segments shown clock pulses, hence the clock timing pulses are indicated as also having a discontinuity at that time.

Figure 5:
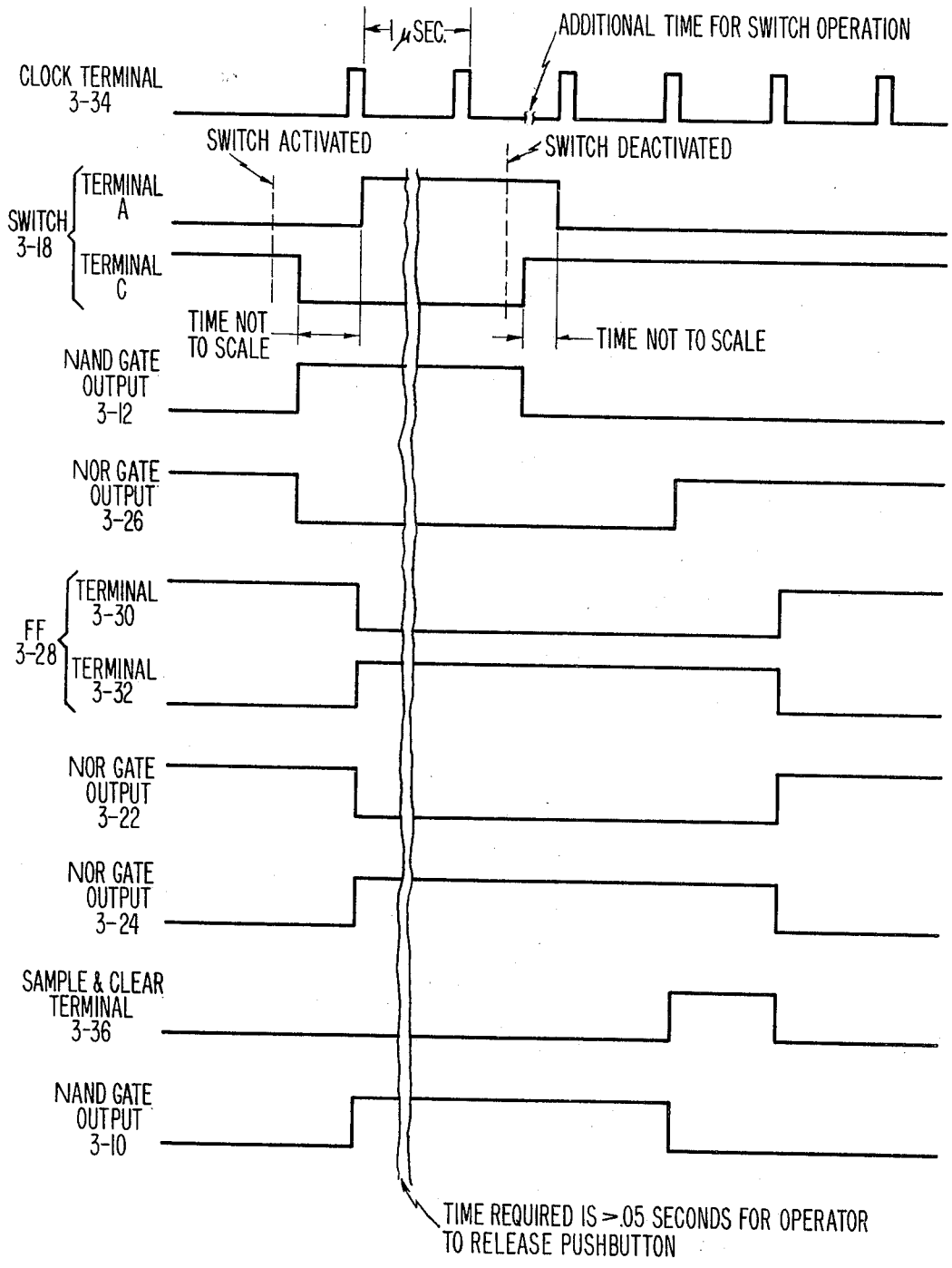
FIGURE 5 is also a timing diagram, however, its purpose is to illustrate the conditions when the sample and clear signal arrives after the pushbutton is released.

Refer next to FIGURE 5. There is shown a similar diagram to that illustrated in FIGURE 4. However, as previously noted, in this diagram the sample and clear signal is received after release of the pushbutton 3-18. Further in this figure the time discontinuity required for the operator to release the button is illustrated to the left of the figure. This, of course, is necessary since the sample and clear signal 3-36 must occur to the right of the time separation. While the remaining waveforms in the figure occur in a similar manner to those previously illustrated with reference to FIGURE 4, it should again be noted with relation to terminals a and c that a number of clock pulses will occur between the shift in signal level and terminal c from a low to a high level and a subsequent shift in signal level at terminal a from a high to a low level. This, as noted, is required by the physical transfer of the switch plunger.

To summarize the operation of the present circuit we consider first the switch operation, second the readout and finally the switch release. In the switch operation mode the holding switch will leave its normally closed position, make the normal open contact and ground the input to the NAND gate long enough for the clock to set the holding flipflop. Next, the holding flipflop high output level will cause ground at the output of the NOR gate. This causes the high level at the output of the next NOR gate and, in turn, puts a high level at its output to thereby prevent any further action (bounce) of the switch from effecting the circuit.

In the readout condition, a computer program, for example, is interrupted when the holding flipflop is set. The holding flipflop may be sampled at any time by the computer program. The input which samples the holding flipflop will also clear the flipflop at the same clock time. The switch release operation occurs as the switch plunger is released. This causes terminal c to go to a high level which continues to disable additional setting pulses applied to the holding flipflop. It should be noted that the switch is a break before make type and thus will open the circuit between the terminals a and b of the switch prior to the closure of terminals c and d. Next, the switch returning to its normally closed position resets the latch of the cross-coupled NOR gates 3–22 and 3–24 which prepares for a new entry by the switch 3–18 if the holding flipflop 3–28 has been sampled and reset by the computer program. Finally if the holding flipflop is not read and reset by the time that the switch 3–18 is returned to its normal condition the input to NOR gate 3–22 remains at a high level thereby preventing the NOR gate 3–24 from providing any change at the a terminal. Thus the switch is not bounced back to the terminal it was first connected to and no amount of switch closure bounce will be seen by the computer. And whether it is connecting normally open or normally closed contacts the computer will only see one entry regardless of the length of time the switch is held on. A unique device is therefore provided which includes a means of sensing, by logic circuitry only, a pushbutton closure of an undetermined length of time without sensing the same signal more than once until the switch is released for resetting. Thus it combines the features of logical anti-bounce and single sensing.

What has been shown therefore is a logical sensing single pushbutton operation circuit. The disclosed circuit ignores switch bounce, stores the switch operation, clears the signal when read by a computer and when the pushbutton is released.

Obviously many modifications and variations of the present invention are possible in the light of the above teachings. It is therefore to be understood that within the usage of the appended claims the invention may be practiced other than the specifically described and illustrated.

What is claimed is:

1. A logic sensing, single pushbutton operation circuit comprising a pair of NAND gates, an NOR gate commonly connected to both of said pair of NAND gates, a holding flip-flop having a first and a second output terminal, said holding flip-flop connected to said NOR gate, and a first and a second feedback circuit means individually connected between each of said pair of NAND gates and said first and said second flip-flop output terminals, respectively, to thereby provide a logical sensing circuit capable of ignoring switch bounce and storing switch operation.

2. The logic sensing circuit as set forth in claim 1, wherein each of said pair of NAND gates has a first and a second input terminal, and said circuit further includes a pushbutton switch connected to the first and second input terminals of one of said NAND gates for alternately connecting said first and second input terminals to a ground reference source, and a source of sample and clear signals connected to the second input terminal of the other NAND gate of said pair.

3. The logic sensing circuit as set forth in claim 1 wherein the second feedback means is an asynchronous flip-flop circuit created by cross coupling a first and a second NOR gate circuit.

4. A logic sensing, single pushbutton operation circuit comprising a first and a second NAND gate, a pushbutton switch connected to said second NAND gate, a source of sampling and clear signals connected for application to said first NAND gate, a first NOR gate connected to said first and said second NAND gates to receive the respective output signals therefrom, a holding flip-flop connected to said first NOR gate to be set and cleared thereby, a source of clock signals also connected to said holding flip-flop, a first feedback means connected between said holding flip-flop and said second NAND gate to latch and maintain said NAND gate in a predetermined condition in response to one output signal from said holding flip-flop and a second feedback means connected between said holding flip-flop and said first NAND gate means to thereby provide a circuit capable of ignoring the bounce of said pushbutton switch, of storing the operation of said switch, of providing a clear signal when the conditon of the holding flip-flop is read by a computer and of resetting the logic sensing circuit when the pushbutton is released.

5. The logic sensing circuit as set forth in claim 4 wherein said second NAND gate has a first and a second input terminal, said first input terminal is normally connected to a positive voltage source until grounded by the depression of said pushbutton switch plunger.

6. A logic sensing single pushbutton operation circuit comprising a first and a second NAND gate, a pushbutton switch connected to said second NAND gate, a source of sampling and clear signals connected for application to said first NAND gate, a first NOR gate connected to said first and said second NAND gates to receive the respective output signals therefrom, a holding flip-flop connected to said first NOR gate to be set and cleared thereby, a source of clock pulse signals also connected to said holding flip-flop, a first and a second NOR gate interconnected in a cross coupled manner and connected between said holding flip-flop and said second NAND gate to latch and maintain said NAND gate in a predetermined condition in response to one output signal from said holding flip-flop and a connecting means between said holding flip-flop and said first NAND gate means to thereby provide a circuit capable of ignoring the bounce of said pushbutton switch, of storing the operation of said switch, of providing a clear signal when the condition of the holding flip-flop is read by a computer and of resetting the logic sensing circuit when the pushbutton is released.

7. A logic sensing circuit as set forth in claim 6 wherein said holding flip-flop includes means for providing an output signal at a first output terminal which corresponds to the negative going trailing edge of successive clock pulses.

8. A logic sensing, single pushbutton operation circuit comprising a first and a second dual input NAND gate, a make before break pushbutton switch connected to both input terminals of said second NAND gate, a source of sampling and clear signals connected for application to one input terminal of said first NAND gate, a first NOR gate connected to said first and said second NAND gates to receive the respective output signals therefrom, a holding flip-flop connected to said first NOR gate to be set and cleared thereby, a source of clock signals also connected to said holding flip-flop, an asynchronous feedback flip-flop connected between said holding flip-flop and the first input terminal of said second NAND gate to latch and maintain said second NAND gate in a predetermined condition in response to one output signal from said holding flip-flop and a connecting means between said holding flip-flop and the other input terminal of the first NAND gate means to thereby provide a circuit capable of ignoring the bounce of said pushbutton switch, of storing the operation of said switch, of providing a clear signal when the condition of the holding flip-flop is read by a computer and of resetting the logic sensing circuit when the pushbutton is released.

9. The logic sensing circuit as set forth in claim 8 wherein said holding flip-flop includes an inverting gate connected in series with its clear terminal.

References Cited

UNITED STATES PATENTS

| 3,265,974 | 8/1966 | Thomas | 328—63 |
| 3,311,754 | 3/1967 | Linder et al. | 307—247 X |
| 3,324,306 | 6/1967 | Lockwood | 307—247 X |
| 3,335,293 | 8/1967 | Horgan | 307—218 |
| 2,906,894 | 9/1959 | Harris | 307—247 X |

DONALD D. FORRER, Primary Examiner

R. C. WOODBRIDGE, Assistant Examiner

U.S. Cl. X.R.

307—218, 269; 328—63, 192, 195